(12) United States Patent
Hess et al.

(10) Patent No.: US 8,277,170 B2
(45) Date of Patent: Oct. 2, 2012

(54) COOLING CIRCUIT FOR USE IN TURBINE BUCKET COOLING

(75) Inventors: John Raymond Hess, Seneca, SC (US); Kenneth Moore, Greenville, SC (US); Eric Roush, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1008 days.

(21) Appl. No.: 12/121,921

(22) Filed: May 16, 2008

(65) Prior Publication Data
US 2009/0285680 A1 Nov. 19, 2009

(51) Int. Cl.
F04D 29/58 (2006.01)
(52) U.S. Cl. .......................... 415/115; 415/116; 415/144
(58) Field of Classification Search .................. 415/115, 415/116, 144, 176
See application file for complete search history.

(56) References Cited

U.S. PATENT DOCUMENTS

| | | | |
|---|---|---|---|
| 3,826,084 A | 7/1974 | Branstrom et al. | |
| 3,936,215 A | 2/1976 | Hoff | |
| 4,309,147 A | 1/1982 | Koster et al. | |
| 4,456,427 A | 6/1984 | Evans et al. | |
| 4,513,567 A * | 4/1985 | Deveau et al. | 60/782 |
| 4,910,958 A | 3/1990 | Kreitmeier | |
| 5,120,192 A | 6/1992 | Ohtomo et al. | |
| 5,226,785 A | 7/1993 | Narayana et al. | |
| 5,269,653 A | 12/1993 | Evans | |
| 5,317,877 A | 6/1994 | Stuart | |
| 5,394,687 A | 3/1995 | Chen et al. | |
| 5,468,125 A | 11/1995 | Okpara et al. | |
| 5,507,620 A | 4/1996 | Primoschitz et al. | |
| 5,575,617 A * | 11/1996 | Marmilic et al. | 415/115 |
| 5,593,274 A | 1/1997 | Carreno et al. | |
| 5,611,197 A | 3/1997 | Bunker | |
| 5,700,130 A | 12/1997 | Barbot et al. | |
| 5,738,488 A * | 4/1998 | Gazzillo et al. | 415/112 |
| 5,918,458 A * | 7/1999 | Coffinberry et al. | 60/785 |
| 6,217,280 B1 | 4/2001 | Little | |
| 6,361,277 B1 * | 3/2002 | Bulman et al. | 416/96 R |
| 6,397,604 B2 * | 6/2002 | Eldrid et al. | 60/782 |
| 6,581,978 B2 | 6/2003 | Li | |
| 6,910,852 B2 * | 6/2005 | Simeone et al. | 415/115 |
| 6,942,445 B2 * | 9/2005 | Morris et al. | 415/1 |
| 6,960,060 B2 * | 11/2005 | Lee | 415/115 |
| 7,143,581 B2 * | 12/2006 | Kobayashi et al. | 60/728 |
| 8,057,157 B2 * | 11/2011 | Roush et al. | 415/1 |
| 2007/0137213 A1 * | 6/2007 | Rickert et al. | 60/782 |

FOREIGN PATENT DOCUMENTS

| | | |
|---|---|---|
| EU | 0313826 A1 | 9/1988 |
| GB | 2042643 A | 1/1980 |
| WO | 97/44902 | 12/1997 |

* cited by examiner

*Primary Examiner* — Ninh H Nguyen
*Assistant Examiner* — Liam McDowell
(74) *Attorney, Agent, or Firm* — Cantor Colburn LLP

(57) ABSTRACT

A system and a method to supply a coolant to a turbine bucket of a turbine. The system includes an extraction system configured to extract air from a main compressor airflow, a supply circuit, at least a part of which is disposed at an exterior of the gas turbine, coupled to the extraction system and configured to transport the extracted air, as an ingredient of the coolant, from the extraction system to a coolant insertion region, and a cooling system, disposed proximate to the coolant insertion region of the gas turbine and coupled to the supply circuit at a position on-board the gas turbine, the cooling system being configured to supply the turbine bucket with the coolant, including the extracted air.

20 Claims, 3 Drawing Sheets

COOLING CIRCUIT FOR USE IN TURBINE BUCKET COOLING

BACKGROUND

Aspects of the present invention are directed to a cooling circuit and, more particularly, to a cooling circuit for use in gas turbine bucket cooling.

The delivery of coolant to turbine rotor buckets or blades is an important issue in gas turbine design and, accordingly, many different systems and methods of accomplishing the delivery of the coolant have been proposed. As an example, U.S. Pat. No. 6,217,280 discusses the use of a closed loop cooling circuit in which coolant flows through a turbine rotor disc. Similarly, U.S. Pat. No. 5,226,785 discusses using an inducer and an impeller to deliver bucket cooling flow while U.S. Pat. No. 5,317,877 discusses running extracted air through a heat exchanger and delivering the air to a rotor through an annulus where the air is pumped up to the turbine bucket inlet using an impeller.

In any case, in current turbine bucket cooling systems, an amount of cooling air required to cool the turbine buckets is approximately 30%-40% of the total parasitic air flow for a given machine. Therefore, any advancement in turbine bucket coolant delivery methods can yield large improvements in the performance of the machine.

BRIEF DESCRIPTION OF THE INVENTION

In accordance with an aspect of the invention, a system to supply a coolant to a turbine bucket of a gas turbine is provided and includes an extraction system configured to extract air from a main compressor airflow, a supply circuit, at least a part of which is disposed at an exterior of the gas turbine, coupled to the extraction system and configured to transport the extracted air, as an ingredient of the coolant, from the extraction system to a coolant insertion region, and a cooling system, disposed proximate to the coolant insertion region of the gas turbine and coupled to the supply circuit at a position on-board the gas turbine, the cooling system being configured to supply the turbine bucket with the coolant, including the extracted air.

In accordance with another aspect of the invention, a system to supply a coolant to turbine buckets of a gas turbine is provided and includes an extraction system configured to extract a set of air supplies from a main compressor airflow, a supply circuit, at least a part of which is disposed at an exterior of the gas turbine, coupled to the extraction system and configured to transport each of the supplies of the extracted air, as ingredients of the coolant, from the extraction system to a coolant insertion region, and a cooling system, disposed proximate to the coolant insertion region of the gas turbine and coupled to the supply circuit at a position on-board the turbine, the cooling system being configured to supply the turbine buckets with the coolant, including each of the supplies of the extracted air.

In accordance with another aspect of the invention, a method of supplying a coolant to a turbine bucket of a gas turbine is provided and includes extracting air from a main compressor airflow, at least partially externally transporting the extracted air, as an ingredient of the coolant, to a coolant insertion region of the gas turbine at an on-board position of the gas turbine, and supplying the turbine bucket with the coolant, including the extracted air.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
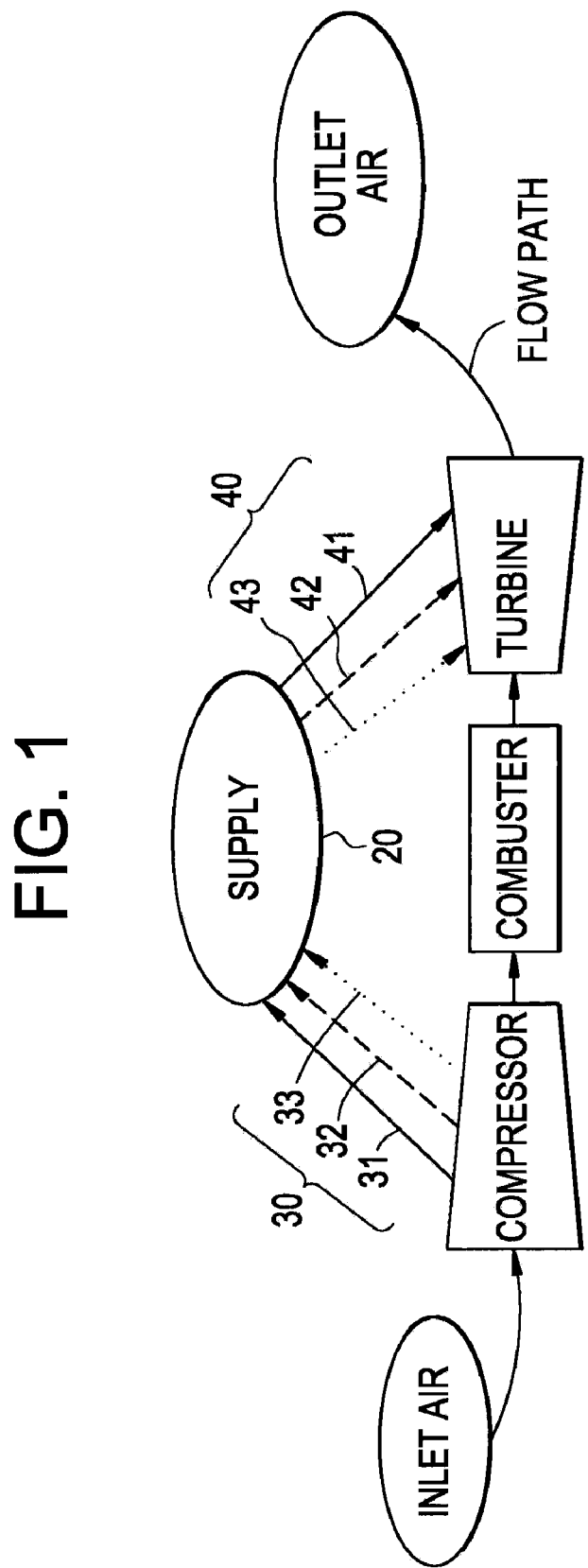
FIG. 1 is a schematic flow diagram illustrating the flow of air through an exemplary gas turbine and through an exemplary supply circuit in accordance with an embodiment of the invention.
Figure 2:
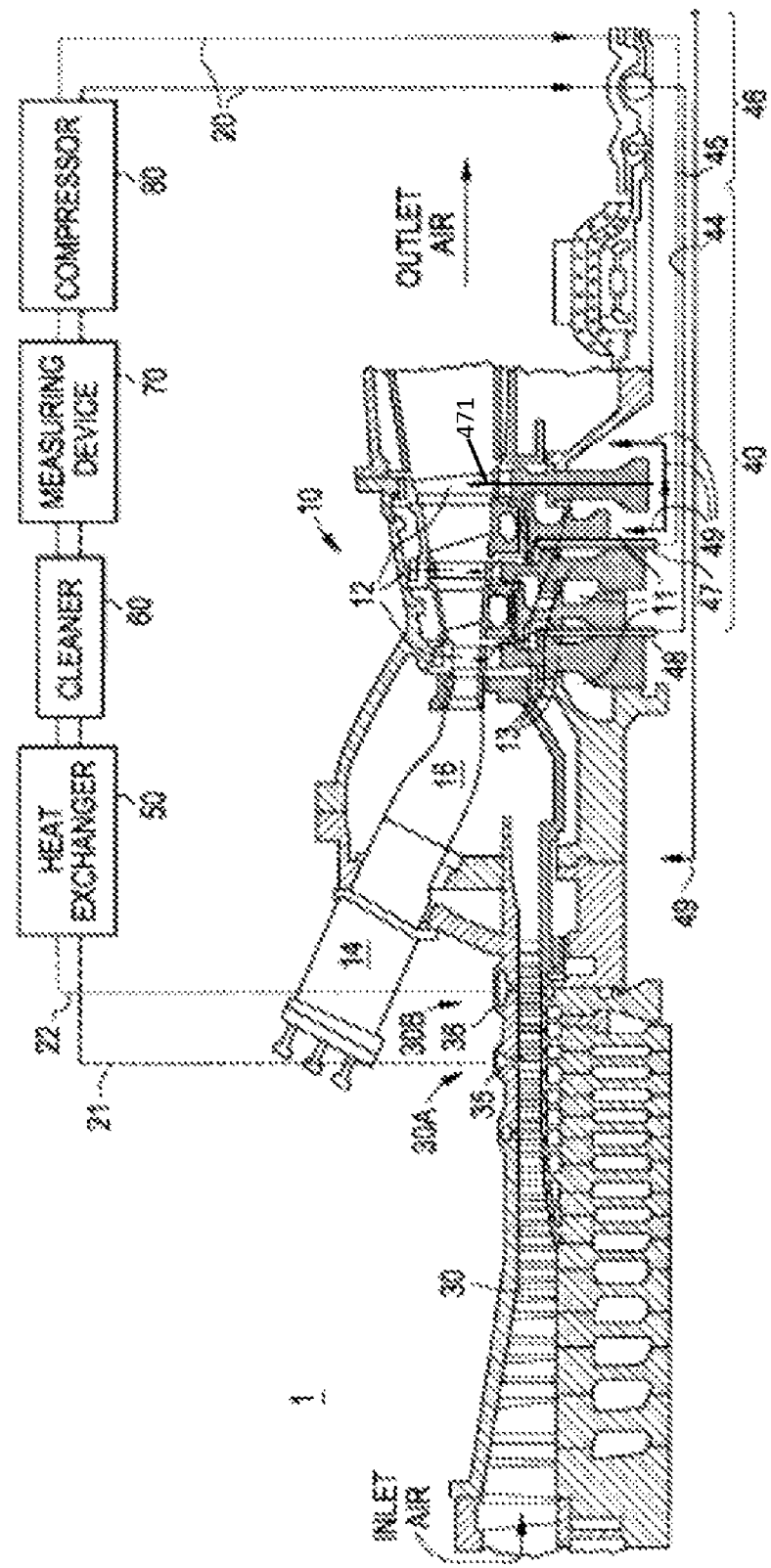
FIG. 2 is a sectional view of an exemplary turbine in accordance with an embodiment of the invention.

Referring to FIGS. 1 and 2, a system for use with a compressor 1 supplies a coolant to a turbine bucket 12 of a gas turbine 10. The system includes an extraction system 30 configured to extract inlet air from at least one of extraction points 30A and 30B located along the compressor 1. A supply circuit 20, coupled to the extraction system 30, is configured to transport the extracted air, as an ingredient of the coolant, from the extraction system 30 to a coolant insertion region 46 of the gas turbine 10. A cooling system 40 is disposed proximate to the coolant insertion region 46 and is coupled to the supply circuit 20 so as to be configured to supply the turbine bucket 12 with the coolant, including the extracted air, from the supply circuit 20.

Given that an amount of cooling air required to cool the turbine buckets is approximately 30%-40% of the total chargeable air flow, as noted above, this system can yield a large increase in performance of the turbine 10. That is, the system enables lower stage air to be used in the coolant and requires a lesser amount of air to that end. Further, the supply system 20 may be employed to cool, clean and/or to otherwise monitor the extracted air during an operation of the gas turbine 10.

The gas turbine 10 includes a fuel mixing region 14 where fuel is mixed with, e.g., inlet air, to form a combustible mixture, and a combustion region 16, downstream from the fuel mixing region 14. Airfoils rotate through the combustion exit gases during the operation of the gas turbine 10 and drive the supporting rotation discs 13, which are separated from one another by inter-disc cavities 11. Although not required, it is understood that the coolant insertion region 46 of the gas turbine 10 is located aft of the extraction points 30A and 30B.

Here, it is noted that the extraction system 30 includes at least one of air supplying bodies 35 and 36, which may include plenums or other similar cavities. The air supplying bodies 35 and 36 are coupled to some number of individual lines 21 and 22 of the supply circuit 20 and are disposed proximate to the extraction points 30A and 30B. In this arrangement, the air supplying bodies 35 and 36 are configured to receive and to store the extracted air from the extraction points 30A and 30B before the air is provided to the supply circuit 20.

Figure 3:
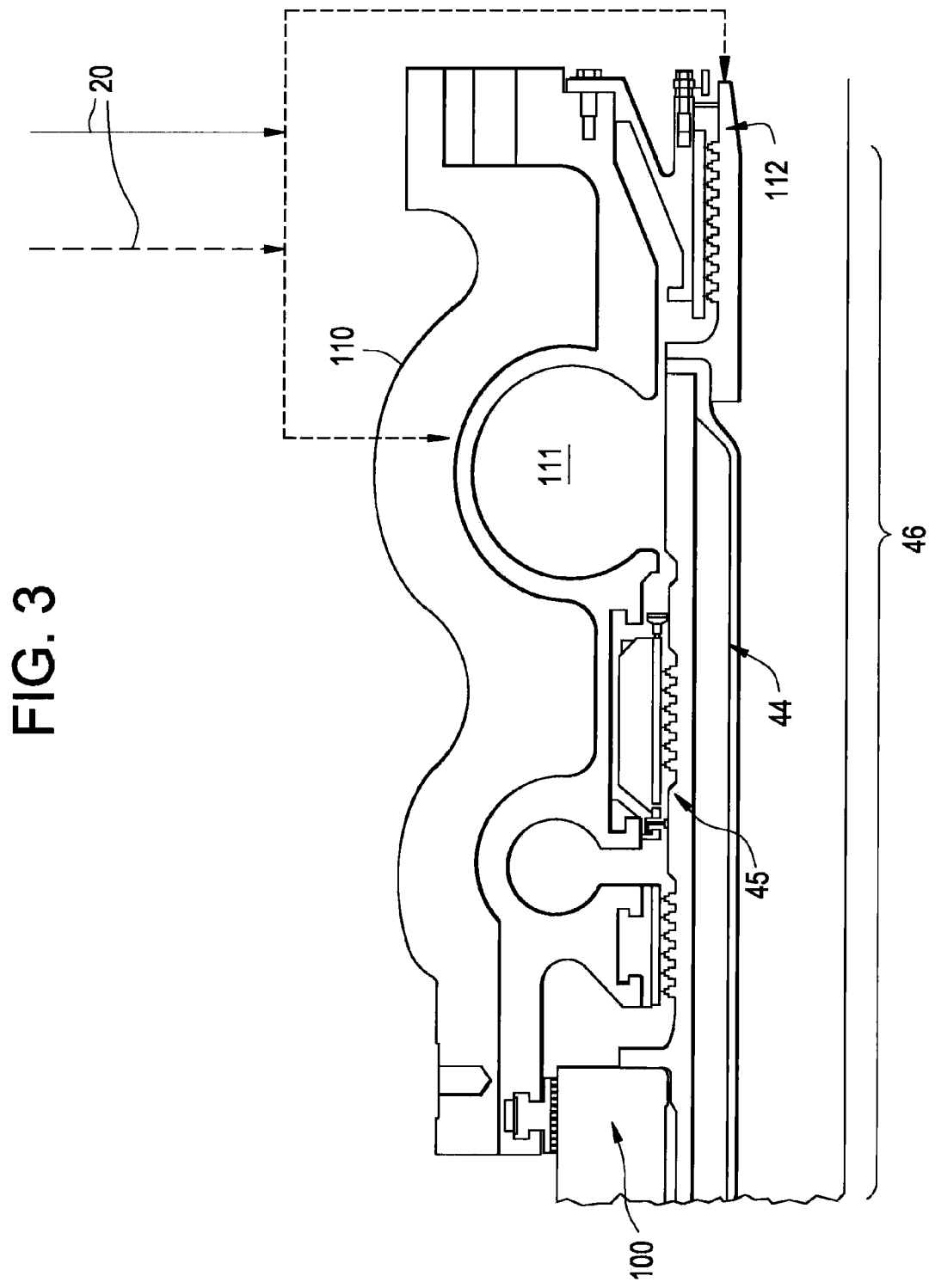
FIG. 3 is an exploded sectional view of an aft section of the turbine of FIG. 2.

With reference now to FIGS. 2 and 3, the cooling system 40 may include at least one of a forced vortexing system and/or a free vortexing system that is coupled to the supply circuit 20 and which is configured to supply the turbine bucket 12 with coolant.

Where multiple sources of coolant, with sufficiently disparate pressures are employed, an axial tube 44, 45 (e.g., rotor bore tubes) is coupled to rotor parts 100, within the coolant insertion region 46. The axial tube 44, 45 is configured to deliver the coolant, including the extracted air, toward the turbine bucket 12. As part of the delivery, a forced vortexing mechanism 47, 48, which is coupled to the axial tube 44, 45, is configured to increase a flow velocity of the coolant. Although not required, the forced vortex mechanism 47 or 48 can include radial tubes, impellers, or a separate rotor structure and increases the coolant flow velocity as the flow moves from a relatively low on-board radius to a higher radius corresponding to a radius of the turbine bucket 12 inlet. The forced vortex mechanism 47 or 48 may also be coupled to the rotation discs 13. Alternately, where the free vortexing system 471 is employed, the coolant is delivered to the turbine bucket 12 with a relatively low circumferential velocity as compared with the forced vortexing case.

Referring now to FIG. 2, it is noted that the supply circuit 20 may include additional features, such as a heat exchanger 50, which is configured to heat and/or to cool the extracted air, a cleaner 60, which is configured to clean, e.g., dirt particles from the extracted air, and a measuring device 70, which is configured to measure various characteristics of the extracted air, such as a temperature, a pressure and/or a purity thereof. Here, the heat exchanger 50, the cleaner 60, and the measuring device 70 are disposed along the supply circuit between the extraction system 30 and the cooling system 40. In an additional embodiment, the supply circuit may also include a compressor 80 to adjust the pressure of the extracted air.

While FIG. 2 illustrates the supply circuit 20 as including the heat exchanger 50, the cleaner 60, the measuring device 70 and the compressor 80, it is understood that these features may be included along the supply circuit 20 in any combination thereof and/or may be jointly or separately discarded.

As noted above, the extracted air for use in the coolant is supplied along the supply circuit 20 and subsequently brought back on board the gas turbine 10. This may be accomplished in various ways, both of which are illustrated schematically in FIG. 43. In one embodiment, one or more external pipes of the supply circuit 20 are coupled to an air gland 111 through which the extracted air flows circumferentially in a converging passage toward the rotor parts 44, 45. The passage is sized such that a velocity of the flow is sufficiently increased to allow the extracted air to flow into the rotor parts 44, 45. In another embodiment, the external pipes of the supply circuit 20 are aligned with a rotor bore tube 112, which is coupled to the rotor parts 44, 45.

In these and other embodiments, leakage of extracted air may occur in several positions. Among these are the meeting of the air gland 111 with the rotor parts 100 and the meeting of the external pipes of the supply circuit 20 with the rotor bore tube 112. According to one option for mitigating effects of this leakage, the cooling system 40 may be further configured with re-circulating mechanisms 49 to re-circulate leaked air. As shown in FIG. 2, the re-circulating mechanisms 49 may be disposed proximate to the cooling system 40 and may operate according to, e.g., forced vortexing or other similar processes to force the re-circulated leaked air into respective components to be cooled and or purged.

The system may be configured to supply a coolant to one or more turbine buckets 12. Here, the extraction system 30 is configured to extract a set of inlet air supplies from a set of extraction points 30A and 30B. As before, the supply circuit 20 is coupled to the extraction system 30 and is configured to transport each of the supplies of the extracted air, in some cases, independently from the others, as ingredients of the coolant, from the extraction system 30 to the turbine buckets 12 in coolant insertion region 46 via the cooling system 40.

Increasingly aft positioned turbine buckets 12 are supplied with a portion of the coolant including supplies of the extracted air which are respectively extracted from increasingly forward positioned extraction points 30A and 30B. For example, as shown schematically in FIG. 1, relatively low-stage air is extracted along forward extraction line 31 and is delivered to a relatively high-stage region of the turbine 10 along aft cooling line 41, relatively medium-stage air is extracted along central extraction line 32 and is delivered to a relatively medium-stage region of the turbine 10 along central cooling line 42, and relatively high-stage air is extracted along aft extraction line 33 and is delivered to a relatively low-stage region of the turbine 10 along forward cooling line 43. As shown in FIG. 2, the cooling system 40 may be configured such that the delivery of the coolant is provided in a radially increasing direction (i.e., radially outwardly from a radial location proximate to the rotor parts 44, 45).

In accordance with another aspect of the invention, a method of supplying a coolant to one or more turbine buckets 12 of a gas turbine 10 includes extracting air from a main compressor airflow, at least partially externally transporting the extracted air, as an ingredient of the coolant, to a coolant insertion region 46 of the gas turbine 10 at an on-board position of the gas turbine 10, and supplying the turbine bucket 12 with the coolant, including the extracted air.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system to supply a coolant to a turbine bucket of a gas turbine, the system comprising:
   an extraction system configured to extract air from a main compressor airflow at a set of extraction points defined axially along the main compressor airflow;
   a supply circuit partially disposed at an exterior of the gas turbine and coupled to the extraction system, the supply circuit being configured to transport a substantial entirety of the extracted air, as an ingredient of the coolant, from the extraction system to the exterior of the gas turbine and then to a coolant insertion region of the gas turbine at a position on-board the gas turbine, which is defined radially inwardly from a radially inward-most portion of a rotation disc driven by the turbine bucket; and
   a cooling system, disposed proximate to the coolant insertion region and coupled to the supply circuit at the position on-board the gas turbine, the cooling system being configured to supply the turbine bucket with the coolant, including the extracted air, in a radially increasing direction.

2. The system according to claim 1, wherein the air is extracted from the main compressor airflow at the set of extraction points, and
   wherein the coolant insertion region of the gas turbine is located aft of the set of extraction points.

3. The system according to claim 1, wherein the extraction system comprises an air supplying body coupled to the supply circuit and configured to receive and to store the extracted air.

4. The system according to claim 1, wherein the cooling system comprises a forced vortexing system.

5. The system according to claim 4, wherein the forced vortexing system comprises:
   an axial tube configured to deliver the coolant, including the extracted air, to the turbine bucket; and
   a forced vortexing mechanism which captures the flow from the axial tube and configured to increase a coolant flow velocity of the coolant.

6. The system according to claim 1, wherein the cooling system comprises a free vortexing system.

7. The system according to claim 1, wherein the supply circuit comprises a heat exchanger configured to heat and/or to cool the extracted air.

8. The system according to claim 1, wherein the supply circuit comprises a cleaning device configured to clean the extracted air.

9. The system according to claim 1, wherein the supply circuit comprises a measuring device configured to measure a predetermined characteristic of the extracted air.

10. The system according to claim 1, wherein the supply circuit comprises a compressor which is configured to adjust a compression of the extracted air.

11. The system according to claim 1, wherein the cooling system is coupled to the supply circuit via a stationary pipe.

12. The system according to claim 1, wherein the cooling system is coupled to the supply circuit via an air gland with a converging circumferential passage.

13. The system according to claim 1, wherein the cooling system is further configured to re-circulate leaked air.

14. A system to supply a coolant to turbine buckets of a gas turbine, the system comprising:
   an extraction system configured to extract a set of air supplies from a main compressor airflow at a set of extraction points defined axially along the main compressor airflow;
   a supply circuit partially disposed at an exterior of the gas turbine, coupled to the extraction system and configured to transport a substantial entirety of each of the supplies of the extracted air, as ingredients of the coolant, from the extraction system to the exterior of the gas turbine and then to a coolant insertion region of the gas turbine at a position on-board the gas turbine, which is defined radially inwardly from radially inward-most portions of rotation discs driven by the turbine buckets; and
   a cooling system, disposed proximate to the coolant insertion region and coupled to the supply circuit at the position on-board the turbine, the cooling system being configured to supply the turbine buckets with the coolant, including each of the supplies of the extracted air, in a radially increasing direction.

15. The system according to claim 14, wherein the air supplies are extracted from the airflow at the set of extraction points, and
   wherein the coolant insertion region of the turbine is located aft of the extraction points.

16. The system according to claim 15, wherein increasingly aft positioned turbine buckets are respectively supplied with a portion of the coolant including those supplies of the extracted air that are respectively extracted from increasingly forward positioned extraction points.

17. The system according to claim 14, wherein the supply circuit transports each of the supplies of the extracted air independently from the others.

18. A method of supplying a coolant to a turbine bucket of a gas turbine, the method comprising:
   extracting air from a main compressor airflow at multiple extraction points defined axially along the main compressor airflow;
   transporting a substantial entirety of the extracted air, as an ingredient of the coolant, to an exterior of the gas turbine and then to a coolant insertion region of the gas turbine at an on-board position of the gas turbine, which is defined radially inwardly from a radially inward-most portion of a rotation disc driven by the turbine bucket; and
   supplying increasingly aft positioned ones of the turbine bucket with the coolant, including the extracted air, in a radially increasing direction.

19. The method according to claim 18, wherein the transporting of the extracted air comprises:
   exchanging heat with the extracted air;
   cleaning the extracted air;
   measuring a predetermined characteristic of the extracted air; and
   compressing the extracted air.

20. The method according to claim 18, wherein the extracting of the air comprises extracting the air at the multiple extraction points, and
   wherein the supplying of the turbine bucket with the coolant comprises supplying multiple turbine buckets with the coolant.

* * * * *